United States Patent [19]

Sabel

[11] 4,373,618
[45] Feb. 15, 1983

[54] REVERSE SPEED SHIFT DEVICE FOR A MOTOR VEHICLE CHANGE-SPEED GEARBOX

[75] Inventor: Gustav Sabel, Cologne, Fed. Rep. of Germany

[73] Assignee: Ford Motor Company, Dearborn, Mich.

[21] Appl. No.: 160,410

[22] Filed: Jun. 17, 1980

[30] Foreign Application Priority Data

Aug. 21, 1979 [DE] Fed. Rep. of Germany ....... 2933719

[51] Int. Cl.³ ............................................. B60K 41/20
[52] U.S. Cl. ................................... 192/4 B; 192/4 C
[58] Field of Search ................... 192/4 C, 4 A, 9, 4 B, 192/4 R; 188/290, 293, 82.1

[56] References Cited

U.S. PATENT DOCUMENTS

| 2,653,487 | 9/1953 | Martin et al. | 192/4 B |
| 2,658,403 | 11/1953 | Marco | 192/4 C |
| 2,961,078 | 11/1960 | Shannon et al. | 192/4 C |
| 3,132,729 | 5/1964 | Garland | 192/4 C |
| 3,204,736 | 9/1965 | Trimmer | 188/290 |
| 4,051,679 | 10/1977 | Collin | 192/4 C |
| 4,054,181 | 10/1977 | Gross et al. | 192/4 A |

FOREIGN PATENT DOCUMENTS

| 480917 | 3/1938 | United Kingdom | 192/4 C |
| 1497401 | 1/1978 | United Kingdom | 188/290 |

*Primary Examiner*—George H. Krizmanich
*Attorney, Agent, or Firm*—F. G. McKenzie; D. J. Harrington

[57] ABSTRACT

A brake device actuated by motion of the shift lever during selection of the reverse gear operating condition has a check plate pivotably mounted on the gearbox housing and actuated by a selector finger of the shift lever. The check plate engages one arm of a lever during the reverse gear selection motion and causes the lever to pivot thereby causing a second arm of the lever to pivot a baffle plate. The over-running shaft has a rotor fixedly mounted thereon which causes an oil stream to flow as the shaft turns. The baffle plate is made to pivot into an obstructing position within the oil stream whereby the over-running shaft is braked. A second embodiment forms the baffle so that it obstructs the oil stream and deflects it onto the rotor thereby increasing the braking effect on the shaft.

2 Claims, 3 Drawing Figures

REVERSE SPEED SHIFT DEVICE FOR A MOTOR VEHICLE CHANGE-SPEED GEARBOX

BACKGROUND OF THE INVENTION

1. Field of the Invention

This invention relates to a reverse speed shift device for a motor vehicle change-speed gearbox having a brake device actuated during the shift movement to brake an after-running gearbox shaft.

2. Description of the Prior Art

A reverse speed shift device, described in German patent application No. 23 36 250, operates to engage reverse drive gears during the preselection movement of the shift lever into the reverse shift plane. This movement loads a spring through a selector finger, which influences a selector fork mounted on the selector sleeve of the gearbox input shaft. The spring force skews the selector fork to brake the gearbox input shaft by operation of the increased friction force.

This reverse shift device has the advantage that braking of the afterrunning gearbox shaft is initiated during the preselection movement of the reverse speed. However, it has the disadvantage that the components necessary for the normal shift actuation are utilized as a brake device, with the result that they must be of complicated and costly construction.

It is customary in motor vehicle construction for a vehicle model to be offered with engines of different capacities and correspondingly adapted clutches but with substantially identical change-speed gearboxes. In many of the various engine-clutch-gearbox combinations it has been discovered that scarcely any difficulties arise when an unsynchronized reverse speed is selected. However, with certain engine-clutch-gearbox combinations, particularly those in which the clutch plate has high inertia, as a result of a a longer after-running time of the connected gearbox shafts, difficulties in the form of disturbing grating noises are experienced when the driver attempts to engage the unsynchronized reverse speed within this after-running period.

Because the driver of a motor vehicle can only be expected to wait a short time between disengaging a forward speed and engaging the reverse speed, it was necessary to find an uncomplicated solution which reduces this prolonged after-running time.

SUMMARY OF THE INVENTION

It is therefore an object of my invention to produce a low cost brake device installable as a service modification for the after-running gearbox shaft in a given motor vehicle change-speed gearbox without unduly modifying the gearbox assembly. This object is achieved according to the invention by providing a brake device actuated by motion of the shift lever during selection of the reverse gear operating condition, which has a check plate pivotably mounted on the gearbox housing and actuated by a selector finger of the shift lever. The check plate engages one arm of a lever during the reverse gear selection motion and cause the lever to pivot thereby causing a second arm of the lever to pivot a baffle plate. The over-running shaft has a rotor fixedly mounted thereon which causes an oil stream to flow as the shaft turns. The baffle plate is made to pivot into an obstructing position within the oil stream whereby the over-running shaft is braked. A second embodiment forms the baffle so that it obstructs the oil stream and deflects it onto the rotor thereby increasing the braking effect on the shaft.

The check plate, supported partially by the selector finger of the selector shaft, acts during the preselection of the reverse speed plane upon an arm of a lever mounted pivotably in the housing. The other arm of the lever pivots a baffle plate mounted on the housing in order to brake an oilstream accelerated by the gearwheels of the after-running shaft. Braking of the after-running gearbox shaft is achieved by simple mechanical means which are lightly loaded. Because the braking does not occur by direct mechanical contact between a rotating part and a brake device, wear is minimal and no adjusting operations are required.

In case the braking of the oilstream accelerated by the layshaft gearwheel block is not sufficient to brake the after-running gearbox shaft, the baffle plate may be constructed as a deflector scoop which throws the oilstream, deflected through 180°, onto the gearwheels of the after-running gearbox shaft to achieve an intensified braking.

BRIEF DESCRIPTION OF THE DRAWINGS

The invention is explained more fully hereinbelow with reference to a preferred embodiment illustrated in the accompanying drawing, wherein.

DESCRIPTION OF THE PREFERRED EMBODIMENTS

Figure 1:
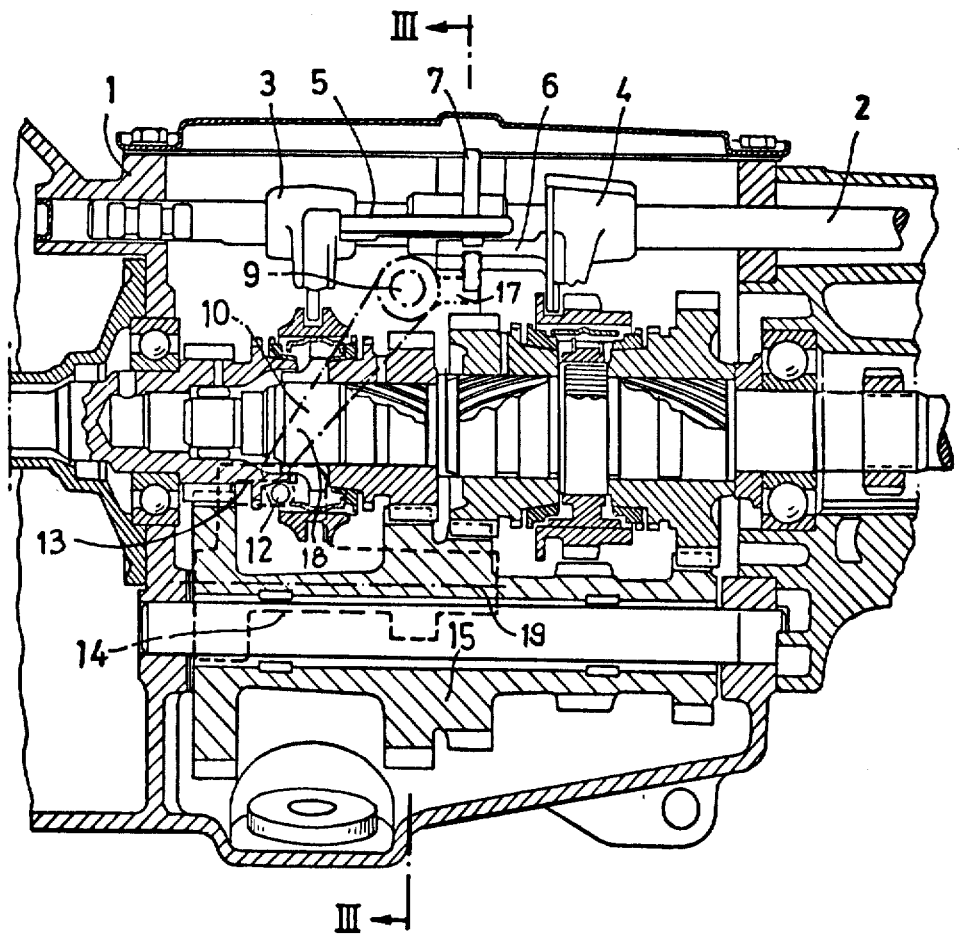
FIG. 1 shows a cross-section through a portion of the gearbox length with a pivotably mounted lever and a pivoted baffle plate.
Figure 2:
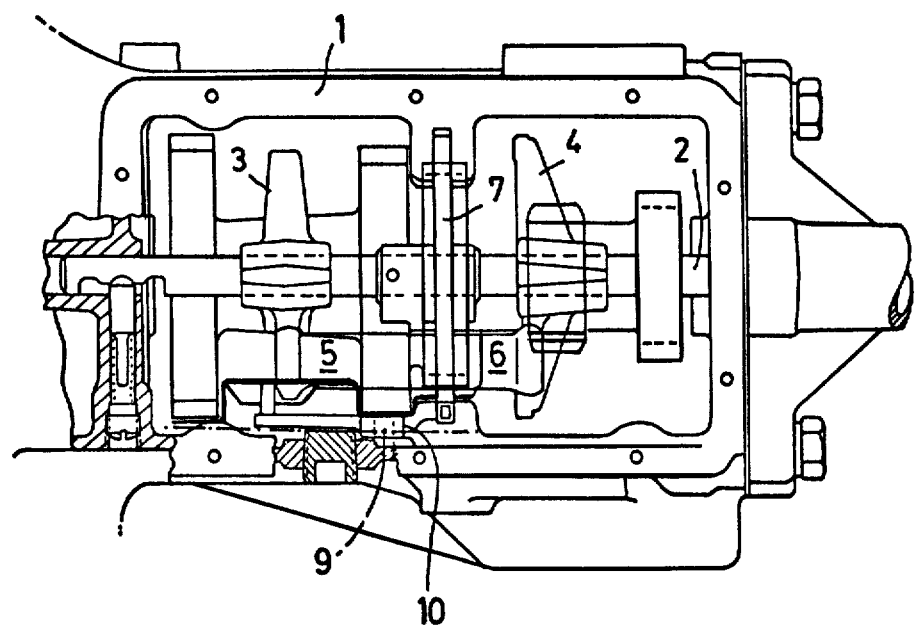
FIG. 2 shows a plan view partially in cross-section of the change-speed gearbox according to FIG. 1 with the gearbox cover removed.
Figure 3:
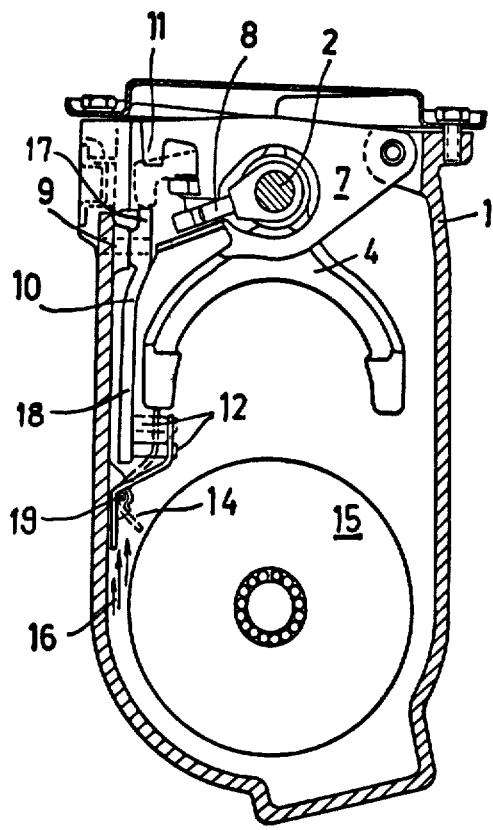
FIG. 3 shows a vertical section made along the line III—III of FIG. 1.

As may be seen from FIGS. 1 and 2, a selector shaft 2 is mounted for axial sliding and rotary motion in the upper section of a housing 1 of a motor vehicle change-speed gearbox. Mounted slidably on the selector shaft 2 are selector fork collars 3 and 4 each having an arm 5,6 extending into the plane of a check plate 7 positioned between the collars. The plate 7 is mounted pivotably in the housing 1 and is further supported by a selector finger 8, best seen in FIG. 3, connected to the selector shaft 2.

A lever 10 mounted pivotally on a bolt 9 in housing 1 has a first arm 17 extending outward from pivot 9 toward check plate 7 and a second arm 18 extending outward from pivot 9 toward baffle plate 14. The upper arm 17 of lever 10 is engaged and operated by a projection 11 of check plate 7 as the latter pivots downward due to counterclockwise movement of selector finger 8 in response to selection of the reverse shift plane. As selector shaft 2 rotates downward, finger 8 bears on check plate 7 causing it to pivot downward and bringing projection 11 into contact with arm 17, thereby rotating lever 10 clockwise, as viewed in FIG. 1. This action causes pin 12 to apply an upward force on slot 13 of baffle plate 14 causing the plate to pivot counter-clockwise, as viewed in FIG. 3, about axis 19 from a rest position shown by solid lines. The oil stream is accelerated by the gear wheels of the afterrunning layshaft gear wheel rotor 15. When so pivoted, baffle plate 14 moves to a braking position, illustrated in FIG. 3 by a broken line, where it obstructs the oil stream 16.

The tendency of the gearbox shaft, the layshaft gearwheel rotor 15 in the present case, to after-run when the clutch is released is substantially reduced by this means. This moderate reduction of the after-running time of the gearbox shaft may be sufficient in many cases to avoid disturbing grating noises when engaging the unsynchronized reverse speed.

The baffle plate 14 must of course be constructed appropriately to the particular application in each case in order to achieve an adequate reduction of the after-running time. Thus the contour of the baffle plate 14, as shown by dash lines in FIG. 1, is adapted to the contour of the layshaft gearwheel rotor 15 in order to project as substantially as possible into the oilstream 16.

If the obstruction of the accelerated oilstream 16 is not sufficient to brake the after-running gearbox shaft 15 adequately, the baffle plate may also be constructed so that it deflects the accelerated oilstream 16 and directs it back onto the gearwheels of the after-running gear box shaft 15.

The preferred embodiment illustrated in the Figures is designed for a single shaft shift device. Obviously, the same advantages of braking the after-running gearbox shaft by hydraulic braking as described can also be achieved with other forms of construction of the shift device, but different arrangements of the lever actuating the baffle plate may be necessary depending upon the individual application.

Because the brake device according to the invention does not rely on mechanical friction, it is true that in some circumstances it is impossible to reduce the after-running time to a specific minimum. On the other hand, this brake device presents the advantage that it operates totally without wear and accordingly remains serviceable throughout the entire useful life of the gearbox.

Having described preferred embodiments of my invention, what I claim and desire to secure by U.S. Letters Patent is:

1. A reverse speed shift device for a change-speed gearbox having an after-running shaft and a selector shaft with a selector finger extending therefrom comprising:
   a pivotably mounted check plate partially supported by the selector finger to cause rotation of the check plate as the selector finger is moved;
   a pivotably mounted lever having first and second arms, the first arm being engageable by the check plate upon movement of the selector finger into the position for reverse gear engagement;
   a pumping device mounted on the after-running shaft adapted to produce an oil stream flowing within the gearbox; and
   a pivotably mounted baffle plate engaged by the second arm of the lever, the baffle plate being moveable from a rest position at which the flow of the oil stream is substantially unobstructed to a braking position at which the oil stream flow is substantially obstructed as the lever is pivoted upon engagement by the check plate through operation of the selector shaft whereby the over-running shaft is braked as the oil stream is obstructed.

2. The reverse speed shift device according to claim 1 wherein the baffle plate is formed to obstruct and deflect the oil stream onto the pumping device whereby the braking effect on the over-running shaft is increased as compared to an obstructed but undeflected oil stream flow.

* * * * *